Feb. 16, 1965   C. PRINDLE   3,169,635
METHOD OF TESTING TUBING AND APPARATUS THEREFOR
Filed Dec. 28, 1960   2 Sheets-Sheet 1
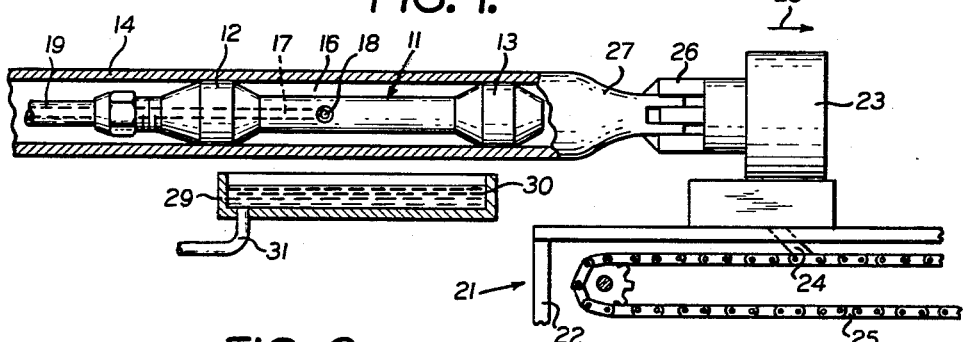
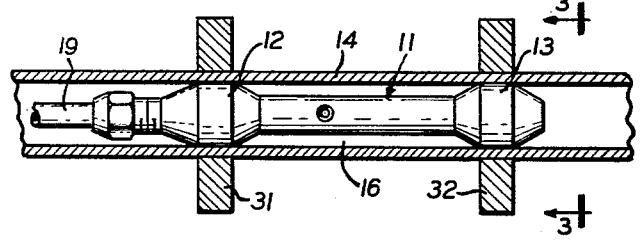
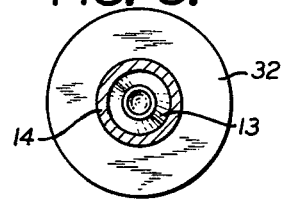
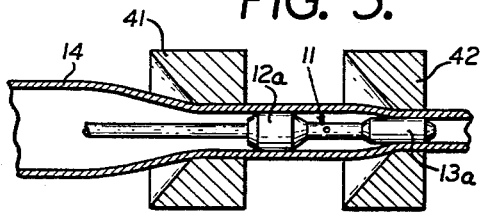
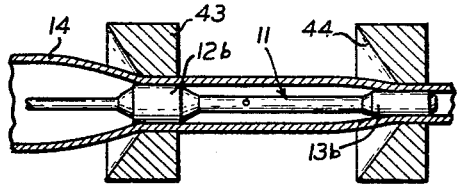
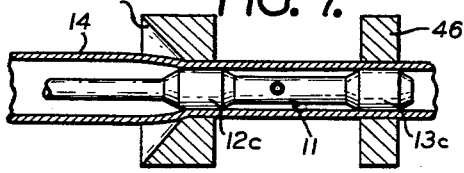
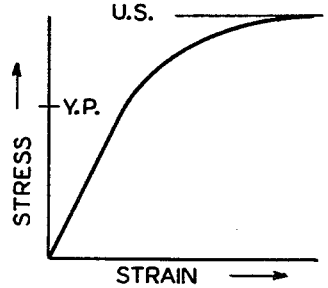
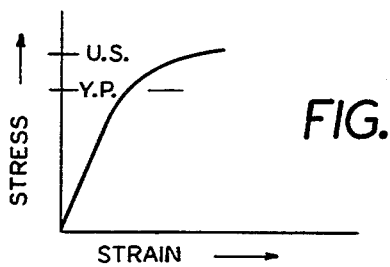
INVENTOR
CHARLES PRINDLE
BY Blum, Moscovitz,
Friedman & Blum
ATTORNEYS.

Feb. 16, 1965 C. PRINDLE 3,169,635
METHOD OF TESTING TUBING AND APPARATUS THEREFOR
Filed Dec. 28, 1960 2 Sheets-Sheet 2

INVENTOR
CHARLES PRINDLE
BY Blum, Moscovitz,
Friedman & Blum
ATTORNEYS.

United States Patent Office 3,169,635
Patented Feb. 16, 1965

3,169,635
METHOD OF TESTING TUBING AND APPARATUS THEREFOR
Charles Prindle, Mount Kisco, N.Y., assignor to Robinson Technical Products, Incorporated, Teterboro, N.J., a corporation of New York
Filed Dec. 28, 1960, Ser. No. 78,911
20 Claims. (Cl. 205—7)

This invention relates to the manufacturing of tubing. More particularly, it relates to the testing of tubing, and to the testing and working of tubing.

Heretofore, tubing has been hydraulically tested by filling the tubing with liquid under pressure sufficient to impose the desired testing stress on the tubing. This procedure is cumbersome since it requires working with long lengths of tubing, for example, 20 foot lengths. Still another disadvantage of the test procedure referred to, is that it determines merely the weakest point in the length of tubing tested. Thus, where a length of tubing has two or more defects, the test procedure reveals only the weakest defect. A principal object of the invention is to provide a test procedure which is free of the just-mentioned disadvantages of the known procedure.

Another problem in tube testing is with respect to tubing which is to be expanded. Finned tubes as are used in heat exchanges are commonly manufactured by positioning the fins at spaced intervals along the tubing, and then hydraulically expanding the tubing beyond its elastic limit to permanently deform it so that the tubing tightly engages the fins. In this manner the fins are secured in place and the fins and tubing are provided in good heat conductivity engagement. Thus, the finned tubing manufacturer in the normal course of using tubing, exposes the tubing to stresses which exceed the yield point stress of the tubing. Hydraulic testing, as heretofore commonly practiced, is not suitable for testing to assure that the tubing is free from defects so as to be satisfactory for expanding beyond the elastic limit, since in the known hydraulic test procedures, the tubing is subjected to a stress less than the yield point stress, and hence it cannot be relied upon to reveal defects which will result in failure upon imposition of stresses which exceed the yield stress and such as occur upon expansion of the tubing beyond the elastic limit. Another principal object of the invention is to provide a procedure whereby tubing can be tested to determine its suitability for expansion beyond its elastic limit.

For attaining the aforementioned objects and other objects as will be apparent from the ensuing description, the invention provides an improved method for hydraulic testing, and also improved apparatus for the testing. Briefly, according to the invention, a relatively long piece of tubing is hydraulically tested by positioning a relatively short test core within the tubing and coaxially therewith. The end portions of the test core extend radially outwardly to contiguous relationship with the tubing so as to provide at the core end portions test pressure seals between the tubing and core, whereby fluid provided between the core and tubing and intermediate the core end portions, can be maintained at test pressure. With the fluid in place and under pressure as aforesaid, the tubing is tested by moving the tubing axially relative to the core so as to expose the tubing to test pressure by successively exposing increments of length of the tubing to the test pressure.

Suitable conduit means are provided for communicating the space between the test core and tubing and intermediate the core end portions with a test fluid supply means. Upon the occurrence of tube rupture, the opening in the tubing will be over a relatively short length thereof and usually of length less than the length of the test core. Fluid will, of course, escape from within the tubing upon occurrence of rupture. As, however, the adjacent section of tubing passes over the test core, test fluid will again fill the space between the core and tubing and intermediate the core end portions and thus testing of the tubing will be commensed immediately following rupture. A short length of tubing can be cut out at each point of rupture and the remaining tube lengths are then to be classed as having passed the test.

Where it is desired to determine the suitability of tubing for expansion beyond its elastic limit, a holding ring can be disposed in fixed relation to the test core and across the tubing from each of the test core end portions, the holding rings extending radially inwardly so that they engage the tubing. The holding rings will then hold the tubing so that the required test pressure seal can be maintained between the test core end portions and the tubing, and the tubing as it passes between the holding rings can be stressed by test pressure byeond its elastic limit.

The invention is further described in reference to the accompanying drawings, in which:

FIG. 1 is a schematic representation of the procedure and apparatus of the invention;

FIG. 2 represents a modification of the showing in FIG. 1;

FIG. 3 is a view taken on line 3—3 of FIG. 2;

FIGS. 5, 6 and 7 represent alternative ways of testing and working tubing;

FIGS. 9 and 10 are stress strain curves of significance hereinafter related.

In the various figures of the drawings, like reference characters refer to corresponding parts.

Figure 4:
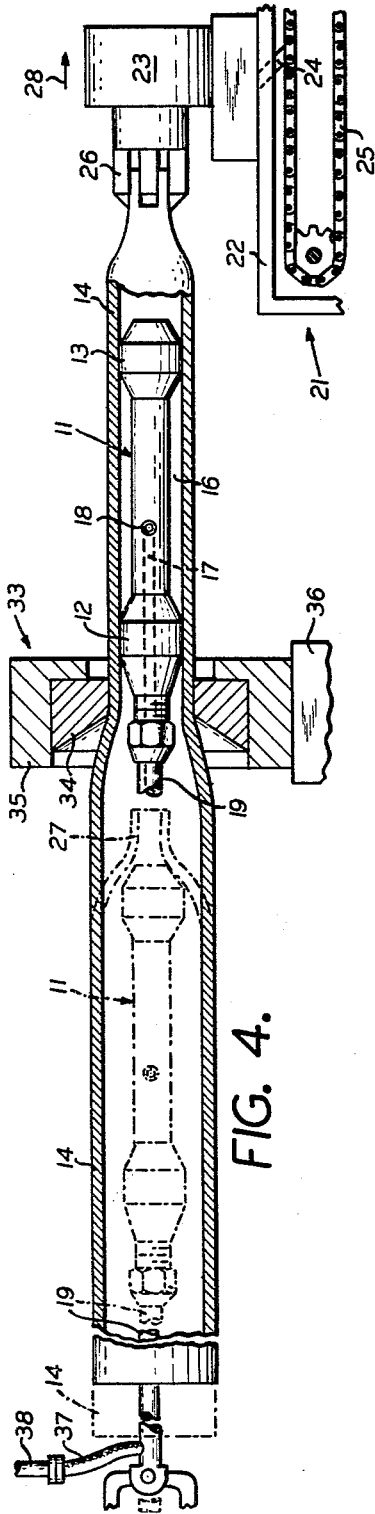
FIG. 4 is a schematic representation of testing according to the invention in combination with working of the tubing.

Referring to the drawings, apparatus according to the invention includes a test core 11 having axially spaced end portions 12 and 13 which extend radially outwardly to contiguous relationship with the tubing so as to provide a test pressure seal between the tubing 14 and test core 11. In the embodiment shown in the drawings, the test core is a rigid element of fixed diameter dimension, and has enlarged end portions so that when the test core is disposed within the tubing, there is provided an annular chamber 16 defined by the core and tubing and extending between the core end portions. A passageway 17 connects the port 18 with supply conduit 19, the port 18 being an entranceway into the annular chamber 16. The conduit 19 is connected to a test fluid supply means, which is represented schematically in FIG. 8 and is described in detail hereinafter. The test fluid supply means includes means for supplying the test fluid under pressure, and thus, with the test core 11 positioned in the tubing 14, fluid under test pressure can be maintained in the chamber 16. In this manner, the length of tubing intermediate the test core end portions 12 and 13 can be hydraulically tested.

According to the invention, a length of tubing of any selected length is tested by moving the tubing axially relative to the core, thereby to expose the tubing to test pressure by successively exposing increments of length of the tubing to the test pressure. Preferably, the test core is maintained stationary during the test and the tubing is moved over the core. An arrangement suitable for operation in this manner is shown in FIG. 1. This includes a draw bench 21 having supporting frame 22 and chuck car 23 which is connected by dog 24 to the endless drive chain 25. The draw bench chuck 26 grips the necked-down end 27 of the tubing 14, and the endless chain 25 moves the chuck car 23 to the right as indicated by arrow 28. The position of the test core 11 is maintained stationary, and hence the tubing is drawn over the test core.

Upon failure of the tubing during testing due to a defect, a portion of the tubing between the test core end portions 12 and 13 will open and test fluid from within the annular chamber 16 will drain from this chamber. To recover this fluid, a pan 29 is positioned below the test core. The test fluid 30 will drop into the pan, and can be returned to the fluid supply means, shortly to be described, by means of conduit 31.

Maintaining test pressure within the chamber 16, depends upon the test core end portions 12 and 13 being contiguous with the tubing 14 so as to provide a test pressure seal. Such seal can be provided in various ways. The fit of the test core 11 in the tubing 14 can be a press fit, or the core can be undersize. In the case of a press fit, inside diameter dimension of the tubing is less than outside diameter dimension of the core so that there is interference between the tubing and the core. Where the core is undersize, inside diameter dimension of the tubing is greater than outside diameter dimension of the core and there is a clearance between the core and tubing.

Where a press fit between the core and tubing is employed, the peripheral surface of the test core end portions 12 and 13 which engage the tubing 14 can be formed of rigid material, and the rigid material is preferably harder than the tubing being tested. For example, where the tubing is copper, the test core can be formed of tool steel. The extent of interference between the core and tubing can be any amount corresponding to about the yield point of the tubing, or it can be less. For example, in the case of ½" diameter x .017" wall copper tubing in the hard drawn condition, the difference in diameter between the inside diameter of the tubing and the outside diameter of the test core end portions can be up to about .001–.002 inch. The expansion of the tubing due to the interference will then be within the elastic limits for the tubing. The interference between the test core and tubing can be such that the tubing is permanently expanded as it passes over the test core by the action of the test core on the tubing. Such operation is not, however, presently preferred.

Where the test core is undersize, i.e., that is inside diameter dimension of the tubing is greater than outside diameter dimension of the core end portions, the clearance between the core and the tubing is correlated with the viscosity of the test fluid so that the test pressure within the chamber 16 is not lost even though there is leakage from the chamber 16.

While the procedure of the invention could be carried out using a gas as the test fluid, liquid is preferred. Water is suitable where the fit of the test core and the tubing is a press fit. Where the core is undersize, a fluid of higher viscosity than water will usually be desirable, and petroleum oil has been found to be satisfactory for such operation where a clearance of about 0.001" is employed.

As to the form of the test core, the form shown in the drawings wherein the test core has enlarged end portions is preferred. Where, however, an undersize core is employed, the core could be of uniform diameter throughout its length.

There is a relation between the sensitivity of the test and the length of tubing exposed to the test pressure. In general for greater sensitivity, greater lengths are required. Desirably, the length of tubing simultaneously exposed to the test pressure is about four times the inside diameter dimension of the tubing or the diameter dimension of the core end portion.

Referring to FIG. 2, in carrying out the procedure of the invention, there can be employed holding rings 31 and 32 which are positioned outside the tubing 14 and opposite, respectively, the test core end portions 12 and 13. The holding rings 31 and 32 are fixedly mounted with respect to the test core end portions 12 and 13, respectively, and extend radially inwardly to engagement with the tubing 14. The holding rings restrain radially outward displacement of the tubing disposed intermediate the core end portions and the holding rings, whereby the tubing is held so that the core end portions provide the test pressure seal. The holding rings can be employed in the embodiment wherein the test core is undersize, in which case the holding rings will serve to maintain suitable clearance between the tubing and test core, or the holding rings can be employed in the embodiment in which the test core is a press fit in the tubing, in which case the holding rings will serve to maintain the tubing in engagement with each of the core end portions.

A feature of the test procedure of the invention is that it can be combined with a tube-working operation, whereby the tube manufacturing procedure is greatly simplified. Thus, the tubing, in an intermediate stage of its manufacture, can be moved through a forming die, and a test core according to the invention positioned in the path of the tubing so that the tubing passes through the forming die and over the test core. Advantageously, the test core is positioned on the tube-worked side of the forming die so that the forming die serves to bring the tubing to the diameter dimension employed for the testing operation. The forming operation can be a drawing operation wherein a mandrel is employed, or a sinking operation. Where the forming operation is a drawing operation, an end portion of the test core can be employed as the mandrel for the forming operation. Also, the tubing can be subjected to two forming operations while being tested, as a forming operation can be carried out as the tubing passes over each end portion of the test core. Where a test core end portion is used as a mandrel, it can be the straight, tapered, or floating plug type. Various combinations of forming and testing are shown in the drawing and are described in detail hereinafter.

Apparatus for simultaneously working and testing tubing is shown in FIG. 4. A sinking operation is performed by the die assembly 33 which includes the female die 34, die seat 35 and the die base 36. The test core 11, which is mounted on the conduit 19 extending axially outwardly along the course of travel of the tubing to the forming die, is positioned on the tube-worked side of the die assembly, and as the tubing 14 is drawn by the chuck car 23 of the tube drawing device 21, through the die 34 and then over the test core 11, the tubing is first sunk to a smaller diameter by the die 34 and is then subjected to testing as it passes over the test core 11.

The operation of the apparatus whereby the test core is positioned in the tubing on the tube-worked side of the die assembly 33, can be generally similar to the operation of known tube drawing machines which include a mandrel and whereby the mandrel is shifted to and away from its working position. Thus, before passing the necked-down end 27 of the tubing 14 through the die 34 for engagement thereof by the chuck 26, the test core can be disposed in a first position which is located on the tube-entering side of the die 34. This first position of the test core and the corresponding positions for the tubing 14 and conduit 19 are indicated in phantom in FIG. 4. With the test core in this first position, the necked-down end 27 of the tubing 14 will also be positioned on the work-entering side of the die 34, as is indicated in phantom representation. Upon inserting the necked-down end of the tubing 14 through the die 34 and engagement of the necked-down end by the chuck 26 and movement of the chuck to the right in the direction indicated by arrow 28, the tubing 14 will be drawn through the die and the test core 11 will be advanced to a second position, which position is located on the tube-issuing side of the die and is represented by the full lines of FIG. 4, and whereat the tubing will be of reduced diameter. Upon arrival at the second position, the movement of the test core will be arrested and the test core will remain in the second position while the tubing is drawn over it. Axial movement of the test core between the first position and second position is controlled in a manner known in the art for positioning of a mandrel in a die. Thus, the conduit 19, which connects with the test core 11, can be connected to a yoke 36 which in turn is connected to an actuating and arresting device (not shown in the drawing). As noted hereinbefore, the conduit 19 carries test fluid to the test core. A flexible connector 37 is employed to connect the conduit 19 with the fluid supply pipe 38.

As noted above, in the embodiment set forth in FIG. 4, the test core, when in its normal testing position, is disposed on the tube-issuing side of the die whereat the tubing is at the reduced diameter corresponding to the tube sinking by the die 34. The test core in this embodiment can be undersize or it can be a press fit, as described hereinbefore. Various alternative ways of forming and testing can be employed. As is shown in FIG. 5, the tubing 14 is subjected to two forming operations while simultaneously being tested according to the invention. The tubing passes first through a sinking die 41 which is effective to reduce the diameter of the tubing, and thereafter passes through the die 42 wherein a drawing operation is performed. The test core 11 is arranged so that one end portion thereof, the end portion 12a, is disposed intermediate the die 41 and the die 42 and the other end portion thereof, end portion 13a, is employed as the mandrel for the drawing operation effected with the aid of the die 42. It will be observed that in this embodiment, the end portions of the test core are of different diameter.

In the embodiment shown in FIG. 6, the tubing passes through a first die 43 and a second die 44 and the test core 11 is disposed so that the end portions 12b and 13b thereof, are positioned respectively within the dies 43 and 44. In this embodiment, the end portions serve as mandrels so that a drawing operation is performed at each of the dies. Also, the dies 43 and 44 can be depended upon to perform the function of holding rings as is described hereinbefore with reference to the embodiment shown in FIG. 2.

In the embodiment shown in FIG. 7, the tubing 14 passes through a die 45 and in the die opening there is disposed the end portion 12c of the test core 11, so that the end portion 12c of the test core functions as a mandrel. Disposed across the tube from the end portion 13c of the test core is a holding ring 46 and this holding ring functions as described hereinbefore with reference to the holding rings illustrated in FIG. 2.

Figure 8:
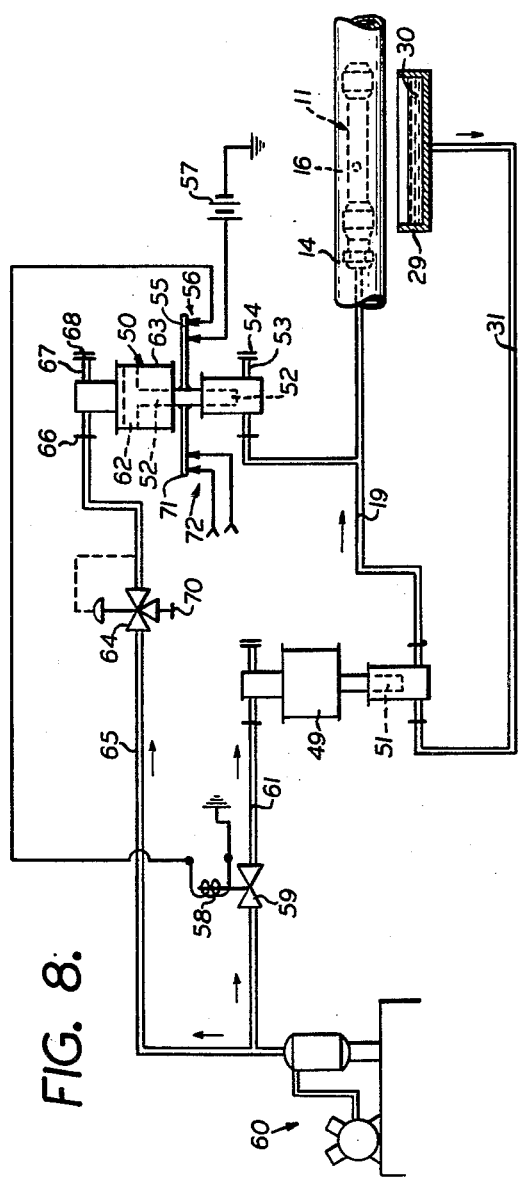
FIG. 8 is a diagrammatic representation of a preferred system for supplying the test fluid.

A preferred fluid supply system is represented schematically in FIG. 8. In order to provide for efficient operation of the test core in the respect that test pressure can be attained rapidly upon commencement of the testing and also following rupture of the tubing, the fluid supply system should be such that high pumping rates are provided without objectionable fluctuations in pressure. In the system represented in FIG. 8, there is employed an air operated fluid pump 49 and an air operated constant pressure accumulator 50. The pump 49 is a displacement pump having piston 51. The accumulator 50 can be of the same construction as the pump 49 except modified so that it operates as an accumulator with the cylinder in which its piston 52 works serving as the accumulator reservoir 52a and with the outlet 53 closed by an end flange 54.

In operation of the fluid supply system, upon decrease in the volume of fluid contained in the system between the discharge side of the pump 49 and the chamber 16 at the test core, the piston 52 of the accumulator 50 moves downwardly forcing fluid contained in the accumulator reservoir 52a into the conduit 19 in order to compensate for the decrease in fluid volume. Upon the piston 52 of the accumulator 50 discharging fluid from the accumulator reservoir, the finger 55 which is mechanically connected with the piston 52, eventually engages the contacts 56, whereby an electrical circuit including the power source 57 and the solenoid 58 of solenoid operative valve 59, is closed. This closing of the circuit, causes the solenoid operative valve 59 to open whereupon air from air compressor 60 passes through air line 61 to the air operated pump 49. The pump then continues to operate until the volume of fluid in the system between the pump 49 and the chamber 16 at the test core 11 is sufficient, and further until the accumulator reservoir 52a has been replenished with fluid. Upon replenishment of fluid in the reservoir, the finger 55 is lifted from the contacts 56, whereupon the solenoid 58 of solenoid operative valve 59 is actuated to close the valve 59 and thereby shut down the pump 49.

The pump 49 draws fluid from the pan 29 which contains a body of fluid 30 and is disposed beneath the test core 11 so that upon oil draining from the chamber 16 upon rupture of the tubing during testing, the oil drops into the pan 29.

A constant pressure is maintained in the fluid system between the pump 49 and the chamber 16 by the accumulator 50. Mounted atop the piston 52 of the accumulator 50 is an air piston 62 which is contained in the air cylinder 63, and a constant pressure is maintained on the upper side of the air cylinder 62 by the pressure control valve 64 which is installed in air supply line 65 extending from the air compressor 60 to the air inlet 66 of the accumulator 50. The air outlet 67 of the accumulator 50 is closed by flange 68, and the pressure control valve 64 functions upon the pressure in the air cylinder 63 dropping below a predetermined level, to communicate the accumulator air cylinder 63 with the air compressor 60; and upon the air pressure in the air cylinder 50 exceeding a predetermined value, the pressure control valve 64 functions to communicate the air cylinder 50 with the vent 70 of the control valve 64. Thus, a constant pressure is maintained in the air cylinder and also in the system between the pump 49 and the chamber 16.

To facilitate locating the position of tube ruptures which occur during the testing, the apparatus can include a marking device whereby upon the occurrence of a rupture the tubing is marked in a manner such that the location of the rupture is readily apparent. The marker (not shown) can be located at any convenient location along the course of the tubing from the testing station where the test core 11 is located, it being merely necessary to coordinate the action of the marker according to its position relative to the test station. The marker can be hooked-up so as to be actuated by the accumulator 50. Thus, upno the occurrence of a rupture, the accumulator piston 52 moves down and the finger 71, which is mechanically connected to the accumulator piston 52, closes the contacts 72 which in turn effect operation of the marker.

As stated previously, the testing procedure of the invention is well suited for testing of tubing which is to be expanded upon utilization of the tubing subsequent to its manufacture. In the manufacture of fin tubing, the fins are disposed at spaced intervals along the tube and fit loosely over the tube. The tubing is then expanded so that it is permanently deformed and tightly engages the fins to secure them in place and also to place the fins and tubing in good heat exchange relationship. The tubing employed for manufacture of the fin tubing is in the annealed condition and thus has an ultimate strength which is relatively high above its yield point. According to the invention, to determine if the tubing is suitable to be expanded it is subjected to hydraulic testing above its yield point and while in hardened condition.

The stress strain curve for the tubing in the annealed condition is represented in FIG. 9 and the stress strain curve for the tubing in hardened condition is represented in FIG. 10. Since in the hardened condition, the ultimate strength and yield point are relatively close together whereas in the annealed condition, the ultimate strength and the yield point are relatively far apart, by hydraulically testing the tubing in the hardened condition by imposition of a relatively small strain in excess of yield point, the suitability of the tubing to withstand, when in the annealed condition, a relatively large strain in excess of the yield point, can be determined.

The test procedure of the invention is well suited for testing the tubing while it is in the hardened condition since the test procedure can be employed in combination with working of the tubing, and where holding rings, such as holding rings 31 and 32 are employed, as is represented in FIG. 2, the procedure of the invention is well suited for subjecting the tubing to stresses which are above the yield point. Thus, referring to FIG. 2, the stress in the tubing as it passes over the test core and between the holding rings 31 and 32, can be in excess of the yield point stress so that, as the tubing passes over the test core, it will be expanded to beyond its elastic limit. The holding rings 31 and 32 will serve to prevent leakage (or excessive leakage in the embodiment wherein an undersize core is used) of test fluid from the chamber 16 notwithstanding expansion of the tubing over the test core.

Instead of employing holding rings as is represented in FIG. 2, forming dies or a forming die in combination with a holding ring, can be used to not only aid in working the tubing but to aid in providing suitable test pressure seals so that the tubing can be expanded beyond its elastic limit as it passes over the test core.

With respect to a particular application of the test procedure of the invention, it is well suited for hydraulically testing copper tubing, e.g. copper tubing of one-half inch of ½" diameter x .017" wall. For such testing, the test core can be machined from tool steel to provide it as an integral piece having enlarged end portions so that when the test core is in place in the tubing the volume of the chamber bounded by the test core and tubing and the core enlarged end portions is about one-half cubic inch. A suitable test fluid supply system would then be a system as in shown in FIG. 8, and wherein the pump 49 and accumulator 50 can each be a 10-500 Series SC hydraulic pump, as is manufactured and sold by SC Hydraulic Engineering Corporation, Los Angeles, California. The volume of the accumulator reservoir can be about one cubic inch. A suitable test pressure for stressing the tubing to a stress below its yield stress is about 3500 p.s.i.

Where the tubing is tested in the hard drawn condition, it can have T.S. of 65,000 p.s.i. yield point of 61,000 p.s.i. and elongation of 5%. Where stressed above its yield point in the test, the stress can be above the yield stress by 10%, or up to 25-50%, of the difference in yield stress and ultimate strength stress. Following such testing, the tubing can be annealed to T.S. 40,000, yield point 32,000 and elongation 25%, to provide it in condition suitable for manufacture of finned tubing.

In the test procedure of the invention, it is not necessary to resort to special precaution to vent air from the chamber into which the test fluid is introduced. Any air remaining in the test chamber will be compressed or absorbed and will not interfere with the test procedure.

While the apparatus disclosed herein has been described as useful for hydraulic testing, it will be apparent that the apparatus is suited for other services such as lubricating the inside of tubular products and while such products are being formed by metal working operations, and to coat the inside of tubular products with protective films.

While the invention has been described with respect to particular embodiments thereof, alterations and modifications of the embodiments shown will occur to those skilled in the art, and it is desired to secure by these Letters Patent all such variations as are within the scope of the appended claims.

What is claimed is:

1. The method of testing a relatively long piece of tubing which comprises positioning a relatively short test core having axially spaced end portions within the tubing and coaxial therewith, said end portions extending radially outwardly to contiguous relationship with the tubing, providing fluid under test pressure between the core and tubing and between said core end portions while leaving the tubing without said end portions free of fluid under test pressure, said core end portions providing a test pressure seal between the tubing and test core, and moving the tubing axially relative to the core while maintaining said fluid under test pressure, thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure, the outside diameter dimension of the core being undersize with respect to the inside diameter dimension of that tubing.

2. The method of testing a relatively long piece of tubing which comprises positioning a relatively short test core having axially spaced, enlarged end portions within the tubing and coaxial therewith, said end portions extending radially outwardly to contiguous relation with the tube to provide an annular chamber defined by the core and tubing and extending betwen said core end portions, providing fluid under test pressure within said annular chamber while leaving the tubing without said end portions free of fluid under test pressure, said end portions providing a test pressure seal between the tubing and test core, and moving the tubing axially relative to the core while maintaining said fluid under test pressure; thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure, the outside diameter dimension of the core being undersize with respect to the inside diameter dimension of the tubing.

3. The method of working and testing tubing which comprises moving the tubing through a forming die, positioning a test core having axially spaced end portions within the tubing coaxially therewith and drawing the tubing over the test core simultaneously with the moving of the tubing through the forming die, said core end portions extending radially outwardly to contiguous relationship with the tubing, providing fluid under test pressure between the core and tubing and between said core end portions while leaving the tubing without said end portions free of fluid under test pressure, said core end portions providing a test pressure seal between the tubing and test core, maintaining said fluid under test pressure while drawing the tubing over the test core thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure.

4. The method of working and testing tubing which comprises drawing the tubing through a forming die, positioning a test core having axially spaced, enlarged end portions within the tubing and coaxial therewith, and drawing the tubing over the test core, said end portions extending radially outwardly to contiguous relation with the tube to provide an annular chamber defined by the core and tubing and extending between said core end portions, providing fluid under test pressure within said annular chamber while leaving the tubing without said end portions free of fluid under test pressure, said end portions providing a test pressure seal between the tubing and test core, maintaining said fluid under test pressure while drawing the tubing over the test core thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure.

5. The method of claim 4, wherein the test core is positioned on the tube-worked side of the forming die.

6. The method of claim 4, wherein one of said test core end portions is disposed within the forming die and serves as a mandrel for the working operation, whereby the tubing is drawn.

7. The method of claim 4, wherein with respect to inside diameter dimension of the tubing, and outside diameter dimension of the core, the core is undersize.

8. The method of claim 7, wherein the fluid is oil.

9. The method of claim 4, wherein the fit of the test core in the tubing is a press fit.

10. The method of testing a relatively long piece of tubing which comprises positioning a relatively short test core having axially spaced end portions within the tubing and coaxial therewith, said end portions extending radially outwardly to contiguous relationship with the tubing, positioning a holding ring outside the tubing opposite each of the test core end portions, said holding rings extending radially inwardly to engagement with the tubing for restraining radially outward displacement of tubing disposed intermediate the core end portions and the holding rings, providing fluid under test pressure between the core and tubing and between said core end portions while leaving the tubing without said end portions free of fluid under test pressure, said core end portions cooperating with holding rings to provide a test pressure seal between the tubing and the test core, and moving the tubing axially relative to the core and holding rings while maintaining said fluid under test pressure, thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure.

11. The method of testing a relatively long piece of tubing which comprises positioning a relatively short test core having axially spaced, enlarged end portions within the tubing and coaxial therewith, said end portions extending radially outwardly to engagement with the tubing to provide a closed annular chamber defined by the test core and tubing and extending between said test core end portions, positioning a holding ring outside the tubing opposite each of the test core end portions, said holding rings holding the tubing in engagement with each of the core end portions, whereby seals are provided between the tubing and the test core, providing fluid under test pressure within said annular chamber while leaving the tubing without said end portions free of fluid under test pressure, moving the tubing axially relative to the core and holding rings while maintaining said fluid under test pressure, thereby exposing the tubing to test pressure by successively exposing increments of length of the tubing to the test pressure so that throughout the testing a length of the tubing between the end portions is exposed to the test pressure while the remaining length of the tubing is free of exposure to fluid under test pressure.

12. The method of claim 11, wherein the tubing is in hardened condition and the test pressure stresses the tubing to between its yield point and its ultimate strength.

13. The method of claim 11, wherein the tubing is worked during the testing, at least one of said holding rings being a forming die effective to work the tubing as it is drawn therethrough.

14. The method of claim 11, wherein the tubing is worked during the testing, at least one of said holding rings being a forming die and the test core end portion opposite said forming die serving as a mandrel for cooperation with the forming die to effect said working.

15. Apparatus for the manufacture of tubing including means for working and testing the tubing comprising a tube working device including a tube forming tool for reducing the inside diameter of the tubing upon passage of the tubing through the tool, and means for advancing the tubing through the tool, a test core for insertion within the tubing coaxially therewith and having axially spaced end portions of fixed diameter dimension which extend radially outwardly for disposition in contiguous relationship with the tubing to provide a test pressure seal between the tubing and test core, said test core being relatively short with respect to the length of the tubing to be tested, a passageway communicating the outside of the core intermediate the core end portions with one end of the core, test fluid supply means, and conduit means communicating said one end of the core with said fluid supply means, said conduit means extending axially outwardly along the course of travel of the tubing to the forming tool, the test core being movable between a first position on the tube-entering side of the forming tool and a second position whereat the tubing will be of reduced diameter, whereby the test core can be positioned axially within the tubing and in said first position and can then be advanced to said second position and the tubing can then be advanced through the forming tool and over the test core, said fluid supply means including means for supplying the fluid under test pressure, whereby when the tubing is advanced over the test core in said second position, fluid under test pressure can be maintained between the core and tubing and between the core end portions.

16. Apparatus according to claim 15, said test core having enlarged end portions.

17. Apparatus according to claim 16, the distance between the test core end portions being about 1–4 times diameter dimension of the core end portions.

18. Apparatus according to claim 15, the test core in said second position having one end portion thereof opposite the forming tool, said apparatus including a holding ring axially spaced from the forming tool for engaging the tubing opposite the other of said test core end portions with the test core in said second position, whereby the forming tool and holding ring hold the radial position of the tubing in a fixed position during the testing and working of the tubing, said test core having enlarged end portions.

19. Apparatus according to claim 15, the test core in said second position having one end portion thereof opposite the forming tool, said apparatus including a holding ring axially spaced from the forming tool for engaging the tubing opposite the other of said test core end portions with the test core in said second position, whereby the forming tool and holding ring hold the radial position of the tubing in a fixed position during the testing and working of the tubing, the distance between the test core end portions being about 1–4 times diameter dimension of the core end portions.

20. Apparatus according to claim 15, the test core in said second position having one end portion thereof opposite the forming tool, including a holding ring axially spaced from the forming tool for engaging the tubing opposite the other of said test core end portions with the test core in said second position, whereby the forming tool and holding ring hold the radial position of the tubing in a fixed position during the testing and working of the tubing, said test core having enlarged end portions and the enlarged end portions being rigid.

(References on following page)

References Cited in the file of this patent

UNITED STATES PATENTS

| | | |
|---|---|---|
| 1,369,890 | Guy | Mar. 1, 1921 |
| 1,391,009 | Schneider | Sept. 20, 1921 |
| 2,578,728 | Musser | Dec. 18, 1951 |
| 2,953,919 | Potts | Sept. 27, 1960 |
| 3,048,998 | Gilreath | Aug. 14, 1962 |

FOREIGN PATENTS

| | | |
|---|---|---|
| 368,111 | Great Britain | Mar. 3, 1932 |
| 801,049 | Great Britain | Apr. 24, 1957 |
| 522,161 | Germany | Apr. 1, 1931 |
| 936,084 | Germany | Dec. 7, 1955 |